(12) United States Patent  (10) Patent No.: US 7,719,467 B2
Norda et al.  (45) Date of Patent: May 18, 2010

(54) DIGITAL CAMERA WITH GNSS PICTURE LOCATION DETERMINATION

(75) Inventors: Carl Jacob Norda, Palo Alto, CA (US); Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 579 days.

(21) Appl. No.: 11/715,769

(22) Filed: Mar. 8, 2007

(65) Prior Publication Data

US 2008/0218407 A1 Sep. 11, 2008

(51) Int. Cl.
*G01S 1/02* (2010.01)
*G01C 21/00* (2006.01)

(52) U.S. Cl. .............. 342/357.13; 342/357.06; 701/213

(58) Field of Classification Search ........... 342/357.06, 342/357.12, 357.13; 701/213, 215
See application file for complete search history.

(56) References Cited

U.S. PATENT DOCUMENTS

| 4,622,557 | A | 11/1986 | Westerfield | 342/357 |
|---|---|---|---|---|
| 5,119,102 | A | 6/1992 | Barnard | |
| 5,345,244 | A | 9/1994 | Gildea et al. | 342/357 |
| 5,379,047 | A | 1/1995 | Yokev et al. | 342/457 |
| 5,379,224 | A | 1/1995 | Brown et al. | |
| 5,420,592 | A | 5/1995 | Johnson | |
| 5,430,759 | A | 7/1995 | Yokev et al. | 375/202 |
| 5,434,787 | A | 7/1995 | Okamoto et al. | 701/214 |
| 5,663,734 | A | 9/1997 | Krasner | 342/357 |
| 5,832,247 | A | 11/1998 | Gildea et al. | 395/309 |
| 5,892,819 | A | 4/1999 | Stumer | 379/211 |
| 5,945,944 | A | 8/1999 | Krasner | 342/357.06 |
| 5,960,355 | A | 9/1999 | Ekman et al. | 455/456 |
| 5,973,639 | A | 10/1999 | Biacs et al. | 342/357 |
| 6,018,784 | A | 1/2000 | Gildea et al. | 710/129 |
| 6,084,544 | A | 7/2000 | Camp, Jr. | |
| 6,191,731 | B1 | 2/2001 | McBurney et al. | |
| 6,225,945 | B1 | 5/2001 | Loomis | 342/357.12 |
| 6,269,446 | B1 | 7/2001 | Schumacher et al. | 713/176 |
| 6,421,608 | B1 | 7/2002 | Motoyama et al. | 701/213 |
| 6,430,415 | B1 | 8/2002 | Agashe et al. | |
| 6,433,731 | B1 | 8/2002 | Sheynblat et al. | |
| 6,433,734 | B1 | 8/2002 | Krasner | 342/357.09 |
| 6,570,530 | B2 | 5/2003 | Gaal et al. | |
| 6,597,311 | B2 | 7/2003 | Sheynblat et al. | |
| 6,643,586 | B2 | 11/2003 | Allen et al. | 701/213 |
| 6,661,372 | B1 | 12/2003 | Girerd et al. | 342/357.12 |
| 6,677,894 | B2 | 1/2004 | Sheynblat et al. | 342/357.1 |
| 6,727,848 | B2 | 4/2004 | Eschenbach | 342/357.09 |

(Continued)

FOREIGN PATENT DOCUMENTS

WO WO 2004/090903 A1 10/2004

OTHER PUBLICATIONS

NXP Founded by Philips Software, swGPS, 8 page from www.software.nxp.com/about/technologies/spot/index.html, Mar. 6, 2007, NXP Software, Eindhoven, The Netherlands.
USPTO action document mailed Mar. 31, 2009 for U.S. Appl. No. 11/510,225.
USPTO action paper mailed Nov. 21, 2007 for U.S. Appl. No. 11/510,224, 10 pages.

(Continued)

*Primary Examiner*—Dao L Phan

(57) ABSTRACT

A digital camera for providing a short burst of global navigation satellite system (GNSS) signal samples in a picture data file with an approximate time for reading by a computer apparatus some time later for determining the geographical location and an accurate time of the picture.

21 Claims, 8 Drawing Sheets

U.S. PATENT DOCUMENTS

| | | | |
|---|---|---|---|
| 6,734,821 B2 | 5/2004 | van Diggelen | 342/357.12 |
| 6,762,715 B2 | 7/2004 | Awata et al. | 342/357.12 |
| 6,813,498 B1 | 11/2004 | Durga et al. | 455/456.1 |
| 6,839,021 B2 | 1/2005 | Sheynblat et al. | |
| 6,856,282 B2 | 2/2005 | Mauro et al. | 342/357.15 |
| 6,865,478 B2 | 3/2005 | Sirola et al. | |
| 6,873,288 B2 | 3/2005 | Heppe | 342/357.12 |
| 6,904,160 B2 | 6/2005 | Burgess | 382/113 |
| 6,956,527 B2 | 10/2005 | Rogers et al. | 342/458 |
| 7,027,486 B2 | 4/2006 | Sullivan | 375/147 |
| 7,064,706 B2 | 6/2006 | King et al. | 342/357.02 |
| 7,103,040 B2 | 9/2006 | Aalbers et al. | 370/388 |
| 7,142,156 B2 | 11/2006 | Gilkes | 342/357.15 |
| 7,228,228 B2 | 6/2007 | Bartlett et al. | 701/207 |
| 7,236,883 B2 | 6/2007 | Garin et al. | 701/213 |
| 7,245,256 B2 | 7/2007 | Odamura | 342/357.09 |
| 7,283,091 B1 | 10/2007 | Loomis | 342/357.12 |
| 7,348,921 B2 | 3/2008 | Yu | 342/357.15 |
| 7,362,718 B2 | 4/2008 | Kakivaya et al. | 370/254 |
| 2003/0016167 A1 | 1/2003 | Dooley et al. | 342/357.02 |
| 2003/0195008 A1 | 10/2003 | Mohi et al. | 455/456.5 |
| 2004/0198386 A1 | 10/2004 | Dupray | 455/456.1 |
| 2004/0203853 A1 | 10/2004 | Sheynblat | 455/456.1 |
| 2005/0212700 A1 | 9/2005 | Diggelen et al. | 342/357.06 |
| 2005/0275726 A1 | 12/2005 | Abraham et al. | 348/207.99 |
| 2006/0088015 A1 | 4/2006 | Kakivaya et al. | 370/338 |
| 2006/0159055 A1 | 7/2006 | Turunen | 370/342 |
| 2006/0208943 A1 | 9/2006 | Gronemeyer | 342/357.12 |
| 2006/0257122 A1 | 11/2006 | Yule et al. | |
| 2007/0030841 A1 | 2/2007 | Lee et al. | 370/352 |
| 2007/0096981 A1 | 5/2007 | Abraham | 342/357.15 |
| 2007/0126625 A1 | 6/2007 | Townsend et al. | 342/357.02 |
| 2008/0048912 A1 | 2/2008 | Loomis | 342/386 |
| 2008/0068262 A1 | 3/2008 | Loomis | 342/357.09 |
| 2008/0120024 A1 | 5/2008 | Obradovich et al. | 701/207 |

OTHER PUBLICATIONS

USPTO action papers mailed Apr. 21, 2008 for U.S. Appl. No. 11/510,224, 13 pages.

USPTO action papers mailed May 28, 2008 for U.S. Appl. No. 11/510,224, 11 pages.

USPTO action papers mailed Jan. 6, 2009 for U.S. Appl. No. 11/510,224, 12 pages.

USPTO action papers mailed Feb. 27, 2009 for U.S. Appl. No. 11/510,224, 10 pages.

USPTO action papers mailed Nov. 28, 2007 for U.S. Appl. No. 11/510,225, 15 pages.

USPTO action papers mailed May 30, 2008 for U.S. Appl. No. 11/510,225, 8 pages.

USPTO action papers mailed Sep. 29, 2008 for U.S. Appl. No. 11/510,225, 7 pages.

USPTO action papers mailed Aug. 29, 2008 for U.S. Appl. No. 11/715,580, 12 pages.

USPTO action papers mailed Nov. 21, 2008 for U.S. Appl. No. 11/715,580, 6 pages.

USPTO action papers mailed Feb. 27, 2009 for U.S. Appl. No. 11/715,580, 7 pages.

J. Zhang, R. Grenfell, Y. Li, R. Deakin, "On GPS satellite velocity and acceleration determination using broadcast ephemeris", 6th International Symposium on Satellite Navigation Technology including Mobile Positioning & Location Services, Jul. 2003, 11 pages.

USPTO action document mailed Dec. 3, 2009 for U.S. Appl. No. 11/510,225, 11 pages.

USPTO action document mailed Oct. 27, 2009 for U.S. Appl. No. 11/510,225, 10 pages.

USPTO action document mailed Jun. 2, 2009 for U.S. Appl. No. 11/510,225, 9 pages.

DIGITAL CAMERA WITH GNSS PICTURE LOCATION DETERMINATION

FIELD OF THE INVENTION

The invention relates to digital cameras and more particularly to a digital camera for providing a short burst of global navigation satellite system (GNSS) signal samples in a picture data file medium for reading by a computer apparatus an arbitrary time later for determining the geographical location and an accurate time of a picture. The invention also relates to GNSS position determination of an event an arbitrary time after the event from a short burst of GNSS signal samples without having an accurate GNSS signal reception time.

DESCRIPTION OF THE BACKGROUND ART

Global Navigation Satellite Systems (GNSS)'s now come in several forms. The United States government maintains the global positioning system (GPS) of earth orbiting GPS positioning satellites that broadcast GPS signals in several formats. The European Space Agency is deploying a Galileo constellation of positioning satellites. And, Russia has been developing its global navigation satellite system (GLONASS) of positioning satellites for many years. The GNSS satellites provide signals having location-determination information and code timing that can be received, measured and decoded by a GNSS receiver for determining a geographical location of the receiver and an accurate GNSS-based clock time.

The acquisition process for finding signal power in a GNSS signal involves correlating a pseudorandom noise (PRN) code carried on the incoming GNSS signal broadcast by the GNSS satellite against a locally generated PRN code replica. The local code replica is correlated with the incoming code at successive code phase offsets until a code phase offset is found that shows signal power. This process is known as a code search.

When signal power is found, the GNSS receiver uses inversions of the code for determining data bit timing. The data bit timing is used for monitoring the GNSS data bits of the incoming GNSS signal until a GNSS clock time for a time-of-transmission is decoded from the data bits. The time-of-transmission is used with orbital ephemeris parameters for a GNSS satellite for calculating the satellite's location-in-space. The locations-in-space for several GNSS satellites are used with the code phase offsets and the data bit timings for providing pseudoranges between the GNSS receiver and the satellites. These ranges are termed "pseudo" because they depend upon the local replica clocking offset. The GNSS receiver performs arithmetic operations on the locations-in-space and the pseudoranges for resolving the replica clocking offset and the location of the receiver. The resolution of the clocking offset and times-of-transmission are used for determining the GNSS clock time.

Conventional GNSS receivers use four GNSS satellites for resolving the four GNSS unknowns for the three dimensions of the geographical location of the GNSS receiver and the fourth dimension for the clocking offset. It is also conventional for GNSS receivers to use fewer than four satellites when other positioning information, such as altitude, inertial motion or map matching, is available to substitute for the positioning information of a pseudorange; and to use more than four satellites for overdetermining the four unknowns.

The GPS C/A code signal data bits have frames having time periods of thirty seconds. The frames are segmented into five subframes of six seconds each. The time-of-transmission for the GPS signal is encoded in the GPS data bits in a Z-count at six second intervals near the beginnings of the subframes. Unfortunately, this means that about six seconds of GPS data bits must be observed in order to ensure receiving the Z-count. Further, in order to ensure that random data is not mistaken for the Z-count, two subframes or about twelve seconds, are sometimes observed. However, there are certain GPS positioning systems where it is undesirable or impractical to receive or use a GPS signal burst that is twelve or even six seconds long.

GPS processing techniques have been developed using a relatively accurate, for example 100 milliseconds, knowledge of time as an assumed time for eliminating the requirement for receiving the Z-count. Unfortunately, there are circumstances where these techniques cannot be used because time with this accuracy is not available. For example, a stand-alone event capture device such as a digital camera might have a real time clock that accumulates an error of one second per day or might be incorrectly set by a user for a time error of several hours or even days.

SUMMARY

It is therefore desirable to provide apparatus and methods for providing a short data burst of GNSS signal samples for later determination of a GNSS location where the GNSS signal reception time may have a receiver time error of several hours or even days.

The disclosure discusses a way to use measurements from an extra GNSS satellite and velocity estimates for GNSS satellites for overcoming the effect of a large receiver time error. An event location system is disclosed that involves the mutual resolution of the conventional four unknowns of a GNSS system of the three dimensions of a location and the fourth dimension of a replica clocking offset and also a fifth dimension of an unknown for the receiver time error. This resolution requires correlation measurements on GNSS signals from one more than a conventional number of GNSS satellites.

Briefly, a system is disclosed that includes a digital camera, or other event capture device, and a computer apparatus. The event capture device receives GNSS signals at an event; samples the GNSS signals; and then writes GNSS signal samples into an event data file medium with an approximate signal reception time tag that differs from GPS-based clock time by a receiver time error. The computer apparatus includes a GNSS sample processor. The GNSS sample processor measures correlations and performs arithmetic operations on the GNSS signal samples in the event data file medium at a later time for determining the location of the event and the GNSS-based time of the event.

In an embodiment a digital camera comprises: a picture device for taking a picture and converting the picture into picture data; a global navigation satellite system (GNSS) signal sampler for sampling the GNSS signals when the picture is taken; a real time clock for generating a time tag for the GNSS signal samples, the time tag having a time uncertainty window greater than a time length of a frame of data bits for the GNSS signals; and a picture file formatter for writing the picture data, the GNSS signal samples and the time tag into a computer-readable picture data file medium configured for processing by a computer apparatus for determining a GNSS picture position based on the GNSS signal samples and providing the picture with the GNSS picture position to a user.

In another embodiment a method for providing a global navigation satellite system (GNSS)-based position for a picture comprises: converting a scene into digital picture data;

sampling GNSS signals from GNSS satellites; generating a time tag for the GNSS signal samples, the time tag having a time uncertainty window greater than a time length of a frame of data bits for the GNSS signals; and writing the picture data in association with the GNSS signal samples and the time tag into a computer-readable picture data file medium in a configuration for processing by a computer apparatus for determining a GNSS picture position based on the GNSS signal samples and providing the picture with the GNSS picture position to a user.

An advantage that may be obtained is that a GNSS-based location of a picture taken by a digital camera is resolved in a separate computer apparatus, thereby reducing the cost of the camera by minimizing the GNSS hardware and software in the camera.

An advantage that may be obtained is that a GNSS-based location where a picture was taken can be determined at a different location at an arbitrary later time, using GNSS signal samples collected at the time and location the picture was taken.

An advantage that may be obtained is that a GNSS-based location is determined without decoding of encoded GNSS data bits for a time-of-transmission, thereby enabling the determination of the GNSS-based location from a burst of GNSS signals shorter than the time between the time-of-transmission data bits in the GNSS signals.

An advantage that may be obtained is that a GNSS-based location and an accurate time that a picture was taken can be resolved where the receiver time error for receiving and time tagging the GNSS signals is several hours, or even days.

An advantage that may be obtained is that the idea of the digital camera may be generalized to an event capture device for recording an event where a GNSS-base location and time of the event may be determined at an arbitrarily later time from GNSS signal samples in an event data file medium without having an accurate time when GNSS signals are received by the event capture device.

These and other embodiments and advantages will no doubt become obvious to those of ordinary skill in the art after reading the following detailed descriptions and viewing the various drawings.

DETAILED DESCRIPTION

The details of several embodiments for carrying out the ideas of the invention will now be presented. It should be understood that it is not necessary to employ all of the details of the embodiments in order to carry out the idea of the invention. Consequently, these details are not to be read as limitations of the below-listed claims of the invention.

The embodiments are described in terms of the global positioning system (GPS) having GPS signals modulated with a coarse/acquisition (C/A) code. However, the idea of the invention may be carried out with other GPS signal formats. Further, the invention may be carried out with a global navigation satellite system (GNSS) where the global positioning system (GPS), the global navigation satellite system (GLONASS), the Galileo system or similar satellite positioning systems, or a combination of these systems provides GNSS positioning signals. It should also be noted that the GNSS signals sources for broadcasting GNSS positioning signals may sources other than satellites, such as pseudolites, or a combination of satellites and sources other than satellites.

Figure 1B:
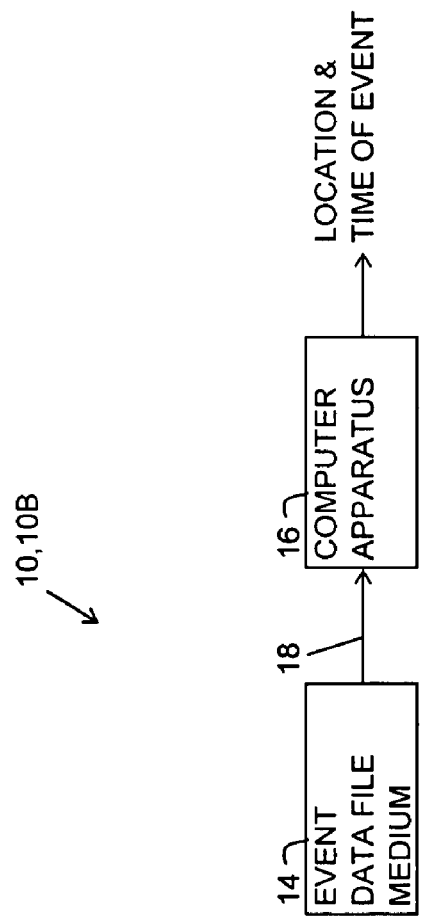
FIG. 1B is a block diagram for a computer apparatus for using the data on the event data file medium to determine the location and time of the event.
Figure 1A:
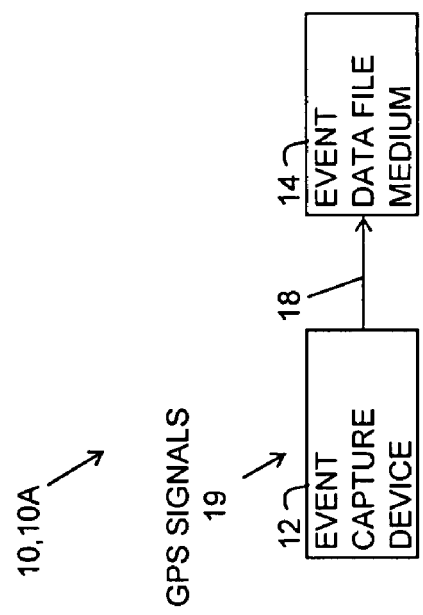
FIG. 1A is a block diagram for an event capture device at an event for writing GPS signals samples into an event data file medium.

FIGS. 1A and 1B show sections 10A and 10B of a block diagram of a GPS positioning system. The system section 10A includes an event capture device 12 and a digital event data file medium 14. The system section 10B includes the event data file medium 14 and a computer apparatus 16. The computer apparatus 16 is referenced to and discussed below as the computer 16. The event capture device 12 may be a still camera, video camera, a tape recorder, telephone, cellular telephone, Wi-Fi base station or the like.

The event capture device 12 converts an event, such as a picture or photograph, a video or series of photographs, a burst of sound, data taken over a time period, data for attributes of a machine operation, or the like into digital form. The device 12 also receives and takes samples 18 of a short burst of GPS signals 19. A digital representation of the event and the GPS signal samples 18 are stored on the medium 14. The medium 14 is a flash card, floppy disc, compact disc (CD), digital video disc (DVD), portable hard disc (HD) or some other type of portable memory.

At some time later the data file medium 14 is read by the computer 16. The later time may be a few seconds to a few years later. There are no restrictions for the location of the computer 16 with respect to the location of the event capture device 12. The data file medium 14 may be physically carried to the computer 16. Alternatively, the data in the data file medium 14 may be transmitted over a communication link to the computer 16. The computer 16 processes the data on the medium 14 for providing a display, print out, or re-formatted data for the event with characters in the form of subtext or appended data for the GPS-based location and/or time of the event.

The system 10 uses GPS signals 19 from one more GPS satellite than the numbers of GPS satellites that a GPS receiver conventionally uses (with or without other positioning information and with or without overdetermination) for determining location and time. The system 10 uses the GPS signals 19 from the extra GPS satellite and estimates of satellite velocities for overcoming and compensating for large receiver time errors, up to plus and minus six hours, and sometimes longer, without knowing or decoding GPS clock time data bits (Z-counts in a C/A code) of the GPS signals 19. The receiver time uncertainty window is permitted to be up to twelve hours for the system 10 to determine a GPS-based position.

In a typical case for three dimensional location (position) determination with no other source of positioning information, the conventional number of GPS satellites without overdetermination is four in order to resolve the four conventional GPS unknowns of the three dimensions of position and a fourth dimension for the local replica clock offset. For this case, the system 10 uses five GPS satellites and satellite velocity estimates for determining the four conventional GPS unknowns and a fifth unknown for receiver time error.

For position determination when altitude is separately available, the conventional number of GPS satellites without overdetermination is three in order to resolve the three unknowns of two dimensions of horizontal position and the third dimension of the local replica clock offset. For this case the system 10 uses four GPS satellites and satellite velocity estimates for determining the three conventional GPS unknowns and a fourth unknown for receiver time error.

Additional GPS satellites are conventional for overdetermination of the four GPS unknowns. For example for first order overdetermination, a conventional number of GPS satellites is five in order to resolve the four conventional GPS unknowns. For this case the system 10 uses a sixth GPS satellite for a first order overdetermination of the five unknowns of the location, replica clocking error and receiver time error.

For position determination when altitude is separately available, the conventional number of GPS satellites for first order of overdetermination is four in order to resolve the three unknowns of two dimensions of horizontal position and the third dimension of the local replica clock offset. For this case the system 10 uses a fifth GPS satellite for overdetermining the three conventional GPS unknowns and the fourth unknown for receiver time error.

Figure 2:
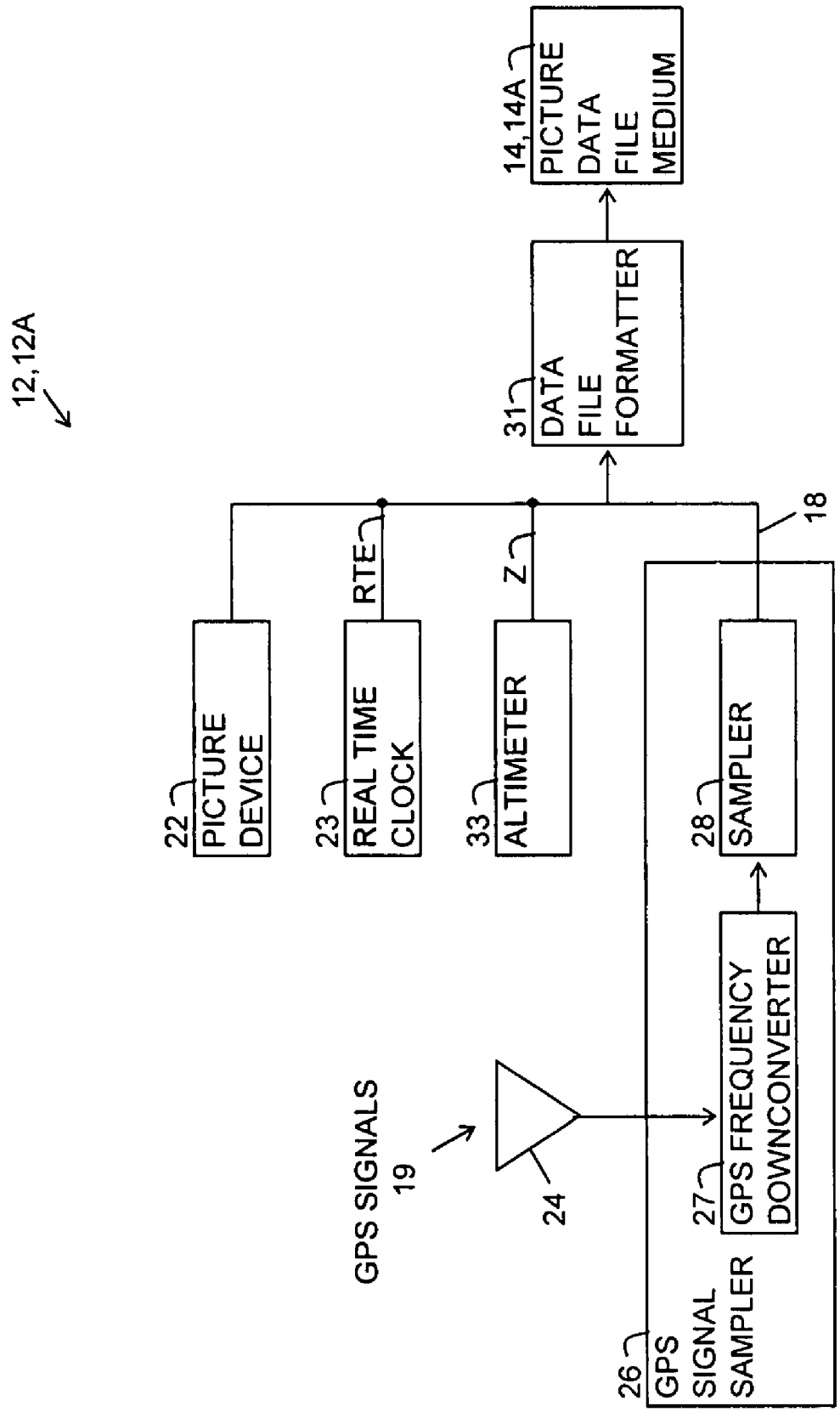
FIG. 2 is a block diagram of a digital camera for the event capture device of FIG. 1A.

FIG. 2 is a block diagram for the event capture device 12 as a digital camera device 12A and the medium 14 as a picture data file medium 14A. The digital camera 12A includes a picture device 22, a real time clock 23, a GPS antenna 24, and GPS hardware and software for a GPS signal sampler 26. The GPS signal sampler 26 includes a GPS frequency downconverter 27 and a sampler 28.

The GPS antenna 24 receives GPS signals 19 from GPS satellites and passes the GPS signals 19 in a conducted form to the GPS frequency downconverter 27. The GPS frequency downconverter 27 converts the radio frequency (RF) of the GPS signals 19 to a lower frequency and passes the lower frequency GPS signals to the sampler 28. The sampler 28 samples and digitizes the lower frequency GPS signals for providing the GPS signal samples 18.

Figure 4:
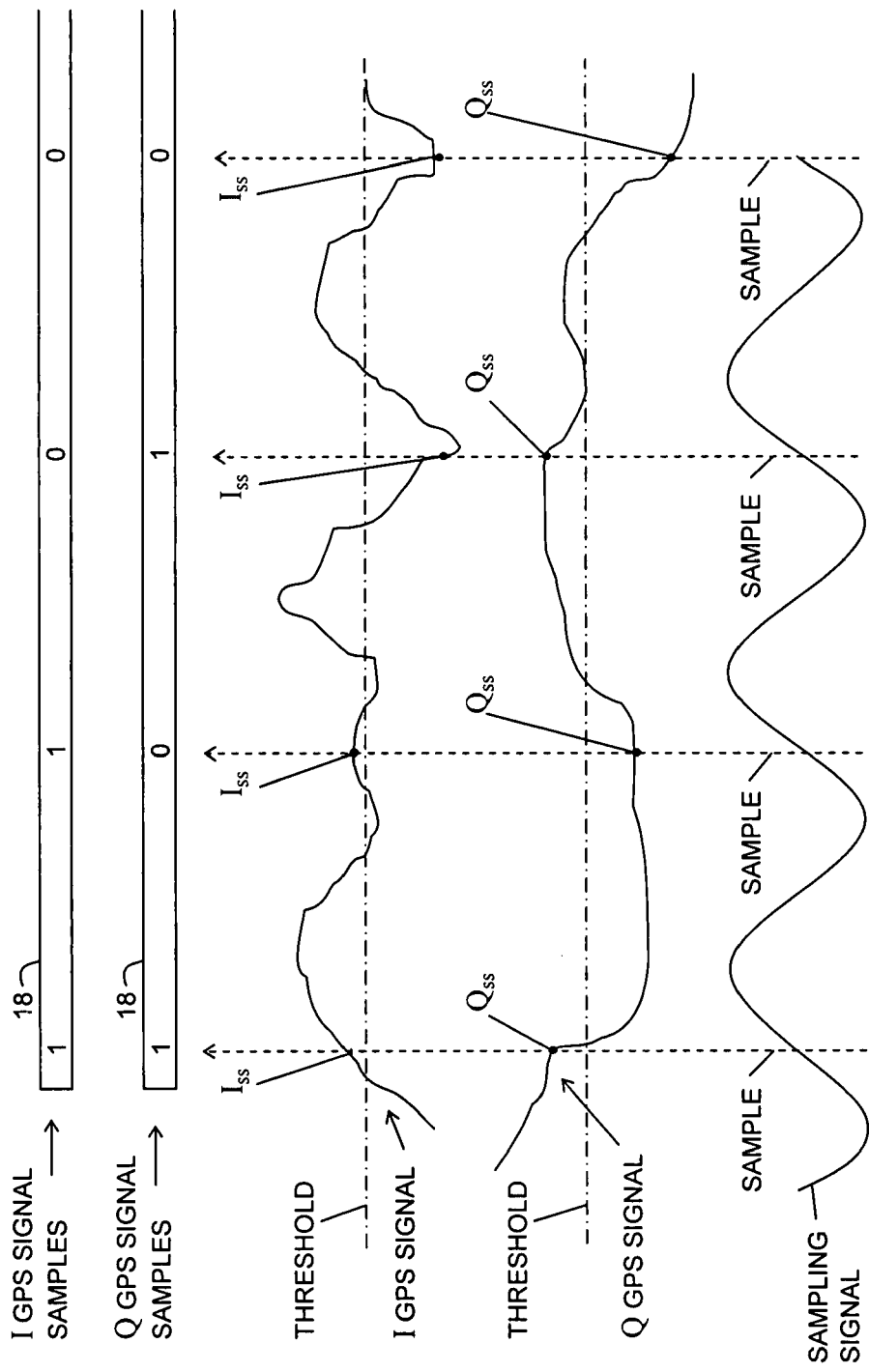
FIG. 4 is a signal chart for GPS signal samples for the system of FIGS. 1A-B, 2 and 3.

The sampler 28 digitizes the downconverted GPS signals for providing digital GPS signal samples 18 for I (in-phase) and Q (quadrature phase) components (see FIG. 4). The samples 18 at this stage represent, at a lower frequency, the superimposed GPS signals 19 simultaneously received by the GPS antenna 24 from several GPS satellites. These signal samples 18 are not the GPS data bits that carry GPS data of Z-count, satellite health, almanac and ephemeris parameters, and the like but are instead discrete digital representations of the incoming RF signals from which the GPS data bits may be recovered by GPS-specific correlation and timing measurements using GPS replica signals.

It is worth noting at this point that the device 12,12A has a low cost because it does not include hardware and software for performing these correlation or timing measurements on the GPS signal samples 18, does not perform the arithmetic operations for processing the measurements for determining location or time, and does not need the extra memory for storing ephemeris or almanac orbital parameters for the GPS satellites. This shifts bill of material (BOM) costs for performing these functions away from the device 12,12A to the computer 16. This is important because the event capture device 12 and especially the digital camera device 12A may have such a low cost that even a few dollars added to the BOM cost can result in a significant percentage increase to the total cost. The construction of the device 12,12A and the computer apparatus 16 shifts much more BOM cost from the device 12,12A to the computer apparatus 16 than previous attempts to provide device location at a computer.

The picture device 22 typically includes a lens, charge coupled devices, displays, user operated keys and other hardware and software for taking a picture for capturing an image or likeness of a scene and converting the picture into digital data. The picture is an event. The real time clock 23 provides an approximate time and a date having an accuracy that depends on the accuracy to which it was set by a user and its time drift since the time it was set. This time error with respect to GPS time is an unknown receiver time error that is local to the device 12,12A. When a picture is taken, the clock time from the real time clock 23 provides an event time tag for the time in the device 12,12A that the GPS signals 19 were received where this time tag has an error of the receiver time error.

The event capture device 12 or digital camera device 12A includes a data file formatter 31 for configuring the data for GNSS signals samples 18, the time tags and the data for the event or picture into the event or the picture data file medium 14 or 14A.

The device 12 or camera 12A optionally includes an altimeter 33 for providing an altitude Z. The altitude Z at the time of the event or picture is formatted by the formatter 31 into the data for the medium 14,14A. Manual entry of the altitude Z may be provided.

The burst of GPS signal samples 18 written in the data file medium 14,14A has a range of about twenty milliseconds to about one second. In exemplary cases the burst is less than about 30 milliseconds, 50 milliseconds, 100 milliseconds, 500 milliseconds, or one second. The length of the burst may be increased when the GPS signals 19 have a low signal strength at the device 12,12A and decreased when the GPS signals 19 are strong at the device 12,12A.

Figure 3:
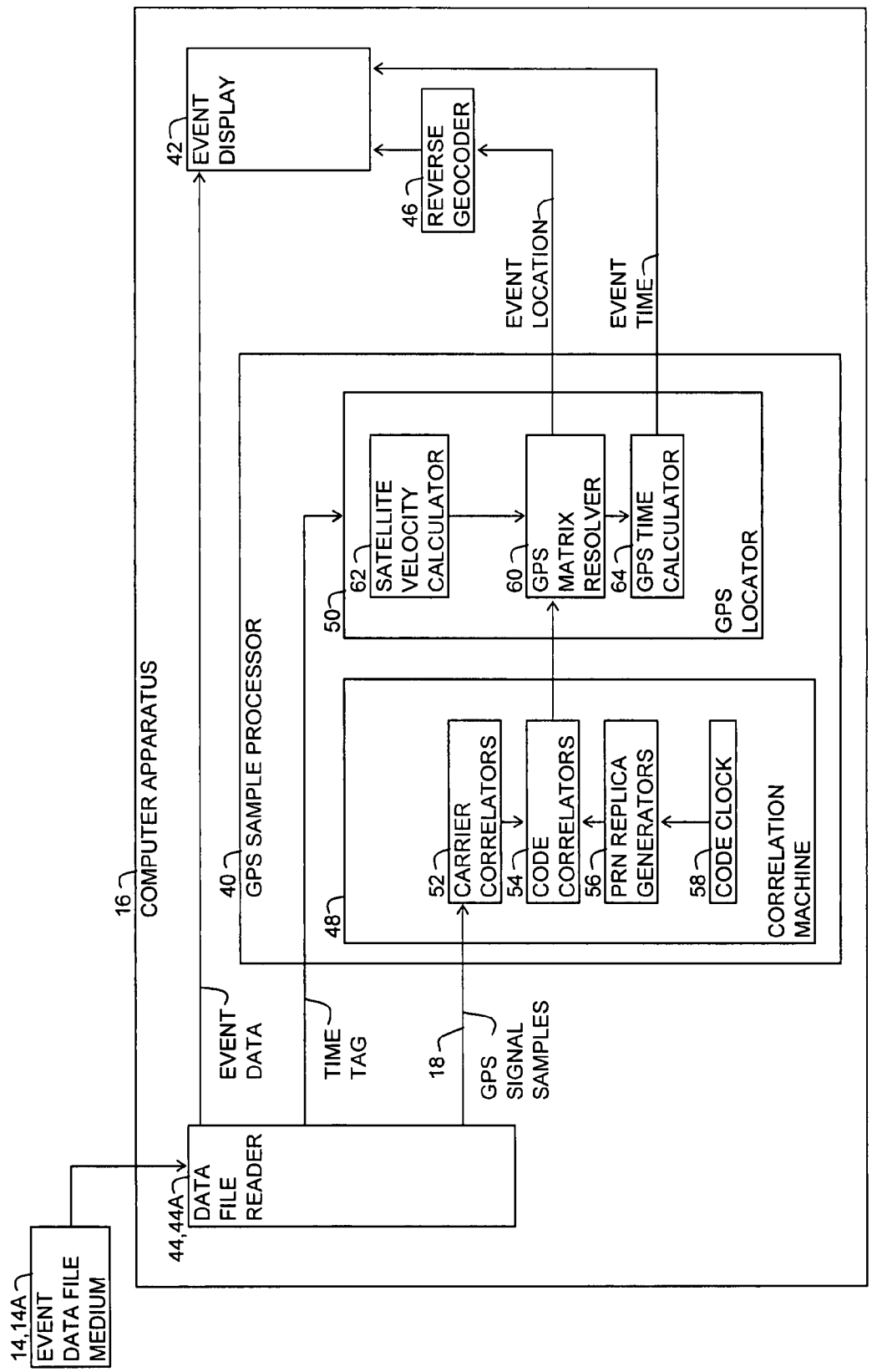
FIG. 3 is a block diagram of the computer apparatus of FIG. 1B having a GPS sample processor having compensation for a large receiver time error.

FIG. 3 is a block diagram of the computer 16. The computer 16 includes a GPS sample processor 40 and an event display 42; and hardware and software for a microprocessor computing system typically including monitor, user controlled keys, mouse, hard disc drive, drives for removable memory, electrical interface connections, and the like that are conventional. The computer apparatus 16 may include a printer. One or more of the drives for removable memory or electrical interface connections is constructed as an event data file reader 44 or picture data file reader 44A for receiving the data in the event data file medium 14 or picture data file medium 14A at any time after the event or picture and passing the data to the GNSS sample processor 40. The time lag between the event or picture and the reading of the medium 14,14A may be hours, days, weeks, months or even years.

The hardware and software in the microprocessor system are configured for processing the event and/or picture data and displaying the features of the event and/or photograph as the event display 42 with alphanumerical characters as subtext for the GPS-based location (position) and time of the photograph. The terms "location" and "position" are used interchangeably in this application. The characters may express the location in geographic form such as latitude, longitude and altitude and/or may use reverse geocoding for providing a name or address or geographical information system (GIS) attribute that is proximate to the geographical location. It should be noted that the computer 16 may be a personal computer with the addition of the GPS sample processor 40 where the monitor of the personal computer shows the event display 42 in a form that is viewable by a human user.

The location of the event or picture is determined in the form of geographical coordinates such as latitude, longitude and altitude or some other two or three dimensional geographical coordinate system. The computer 16 optionally includes a reverse geocoder 46. The reverse geocoder 46 optionally maps the geographical coordinates into names or addresses such as countries, provinces or states, cities, postal codes, street addresses or provides GIS attributes or features of the location of the event.

The GPS sample processor 40 includes a correlation machine 48 and a GPS locator 50. The correlation machine 48 includes carrier correlators 52, code correlators 54, PRN replica generators 56 and a code clock 58 for making correlation and timing measurements on the GPS signal samples 18. The carrier correlators 52 include hardware and software for generating local carrier frequencies that are representative of GPS signal carrier frequencies for performing carrier correlations for each GPS satellite that is under consideration. Generally a GPS satellite may be put into consideration if it is healthy and above a selected elevation mask above the horizon.

When more than a required number of satellites meet these qualifications, certain satellites may be selected for providing a constellation having the best expected dilution of precision (DOP) or the highest signal strengths; or the excess satellites may be used for overdetermination of the GNSS unknown variables. In a conventional GPS receiver GPS signal sample time tags are used with ephemeris parameters for estimating satellite velocities. The satellite velocities are used for estimating Doppler frequency shifts. The estimated Doppler frequency shifts are then used for predicting the correct GPS signal carrier frequencies in order to find GPS signal power more quickly by reducing the number of frequencies that need to be searched to find the GPS carrier frequency. However, the satellite velocities in the system 10 are used, after signal power has already been found, for an entirely different function of resolving a position when there is a large receiver time error for the GPS signal reception time.

The code correlators 54 include hardware and software for using pseudorandom noise (PRN) code replicas for each GPS satellite under consideration for performing code correlations. In order to recover the incoming GPS signal carrier frequencies in the GPS signal samples 18, the carrier correlators 52 multiply the GPS signal samples 18 by local signals at the local carrier frequencies to mix the carrier frequencies in the incoming GPS signal samples 18 to baseband or a predetermined intermediate frequency. The local carrier frequencies that are used are typically much lower than the RF carrier frequencies of the GPS signals 19 originally received by the GPS antenna 24. Several local carrier frequencies for a particular GPS satellite may be tried in series or parallel in what is known as a frequency search.

The PRN replica generators 56 use a replica clocking signal from the code clock 58 for generating phase shifted versions of the PRN replica codes corresponding to the GPS satellites under consideration. For each local carrier frequency that is tried, the code correlators 54 correlate the PRN replica codes from the generators 56 against the PRN codes in the incoming GPS signal samples 18. The replica clocking signal has an unknown replica clocking offset with respect to ticks of GPS time. For example, when the replica clocking signal has a one millisecond time period, the replica clock offset is defined with respect to one millisecond ticks of GPS clock time. The GPS clock time of the ticks is not known until all the unknown variables for GPS location and time are resolved.

The incoming signal PRN codes represent the GPS satellites from which GPS signals 19 were received and sampled in the event capture device 12 and/or digital camera 12A. In general, incoming signal PRN codes will be present and superimposed in the GPS signal samples 18 for all the GPS satellites that are healthy and above the horizon as long as the line of sight to the satellite is not blocked. The correlation machine 48 correlates the PRN code replicas at successive code phase offsets with the incoming signal PRN codes until correlation levels are found that show signal power for a GPS satellite. This process is commonly known as a code search.

The code search may test several code phase offsets in parallel. Fast Fourier Transform (FFT) techniques may be used for the code search or for a combination of the code and carrier searches. The code phase offsets for several GPS satellites are determined in like manner in parallel or in series. The code phase offsets that correspond to the signal powers for the GPS satellites are then used in arithmetic operations for the determination of the GPS-based position and time of the event capture device 12 and/or digital camera 12A. It should be remembered at this point that the replica clocking offset adds an unknown time or phase offset that is common for the code phase offsets for all GPS satellites under consideration.

The carrier correlators 52 recover and wipe out the GPS signal carrier variations from the IQ digitized data and pass carrier-less (meaning the variability of the carrier has been eliminated) digital I and Q components to the code correlators 54. The code correlators 54 operate on the carrier-less digital I and Q components for providing the code phase offsets, with respect to the replica clocking offset, for the code correlations between the pseudorandom noise (PRN) codes carried in the carrier-less digital I and Q signals and the I and Q components of the internally generated PRN code replicas.

After signal power has been found the code correlators 52 use inversions of the code phase correlations for determining data bit timing (DBT). In the case of the GPS C/A code, the data bit timing is used for determining a code integer for the number of code epochs between a DBT edge and the start of the code epoch for which the code phase offset was determined. The code integer, also known as a data bit edge (DBE) integer, corresponds to the number of code epoch time periods between the DBT edge and the start of the code epoch for which the code phase offset was determined. The DBE integer has a range of the number of code epochs in a data bit. For example, for the GPS C/A code, the range is twenty, meaning there are twenty possible DBE integers from zero to nineteen, and the integer increments represent one millisecond. The correlation machine 48 provides the code phase offsets and DBE integers to the GPS locator 50.

The GPS locator 50 includes a GPS matrix resolver 60, a satellite velocity calculator 62 and a GPS time calculator 64. The GPS locator 50 uses the GPS signal samples 18 from an extra GPS satellite and the satellite velocities estimated by the velocity calculator 62 for compensating for large receiver time errors in the time tag reception time of the GPS signals 19 by the device 12,12A.

The GPS matrix resolver 60 uses the code phase offsets together with the DBE integers for a conventional number of GPS satellites plus one extra GPS satellite for determining the location of the event corresponding to the GPS signal samples 18; the local (at the device 12,12A) receiver time error when the GPS signals 19 at the event were received; and the local (at the computer 16) replica clocking offset. For an exemplary case the receiver time error is less than 6 hours and it may be greater than 100 milliseconds, 200 milliseconds, 500 milliseconds, 1 second, 2 seconds, 5 seconds, 10 seconds, 20 seconds, 50 seconds, 100 seconds, 200 seconds, 500 seconds, 10 minutes, 20 minutes, 1 hour, 2 hours or 5 hours. In general, greater receiver time errors will require more resolution iterations and a longer time to converge on the resolution of the unknown variables for the location of the event.

Overdetermination is a feature for using more than the required number of GPS satellites for providing better accuracy or more confidence in the position result for the number of unknowns. For example, the system 10 requires five GPS satellites (or four satellites plus altitude) for determining the five unknowns for the position, replica clocking offset and receiver time error. The GPS sample processor 40 may use a sixth GPS satellite (or a fifth satellite plus altitude) for overdetermining the five unknowns.

FIG. 4 is a time chart of the I (in-phase) and Q (quadrature phase) GPS signal samples 18 for an exemplary downconverted GPS signal. The GPS signal samples 18 have I and Q components in a lower frequency representation of the GPS signals 19 received by the GPS antenna 24. Conceptually, the I and Q GPS signal is captured by a sampling signal at periodic sample times. In an embodiment, the I and Q GPS signal is integrated for time periods centered at the sample times. The levels of the I and Q GPS signal at the sample times are Iss and Qss, respectively.

The Iss and Qss levels are compared to a threshold. The I GPS signal sample Iss takes a "1", or the equivalent, when the Iss level is greater than the threshold and takes a "0", or the equivalent, when the Iss level is less than the threshold. The same for the Q GPS signal sample Qss. These signal samples 18 are not the GPS data bits that carry GPS data of Z-count, satellite health, almanac and ephemeris parameters, and the like but are instead sampled versions the GPS signals 19 that were received by the GPS antenna 24.

The GPS signal can be sampled in several ways. Some GPS receivers use only one bit to represent the I samples and one bit to represent the Q samples (the so-called "sign bits"). Other GPS receivers use 2 bits each to represent the I and Q samples respectively (using both a "sign bit" and a "magnitude bit"). For two bit sampling, three thresholds are used and the I and Q GPS signal samples Iss and Qss take the values "11", "10", "01 and "00".

While two bit I and Q samples can be stored in many ways, for non-real-time software-based processing the samples would preferably be arranged in blocks of I sign samples, I magnitude samples, Q sign samples and Q magnitude samples interleaving each other, with the block size adapted to the processors used throughout the entire processing system. Thus, for modern day 32 bit architectures the samples would be interleaved such that there would be 32 consecutive I sign samples, followed by 32 consecutive I magnitude samples belonging to the same time interval, in turn followed by similarly arranged 32 samples of the Q sign and Q magnitude. These blocks would in turn be aligned with the (block size divided by 8) byte-address boundaries for convenient access by the processors involved, thereby avoiding unnecessary bit or byte shifting operations in the subsequent processing steps.

In the case of one bit sampling, there would be only sign blocks in the data; the magnitude blocks would not be present. For processing chains with weaker 16 bit processors the block size can be scaled back to be 16 or even 8 bit, as appropriate. Similarly, 64 bit blocks, 128 bit and so on blocks could be realized as appropriate on very modern or future processors.

The data file formatter 31 (FIG. 2) for the digital camera device 12A can store the GPS data within a picture image file for formats and applications that allow for such storage of meta-data. In such cases the image file format would typically allow for the inclusion of arbitrary binary data for this purpose in a section of the file, and the I and Q data would be injected into this section in accordance with the file format specification. The internal arrangement of the I&Q data could be as described previously.

In cases where it is for any reason not convenient to store the I and Q samples inside the picture file itself, it can be stored in a separate file. In this case there can be an explicit or implicit association between the image and the I&Q sample files. This can be done by filename convention (e.g. the image file img001.jpg being implicitly associated with the I&Q sample file gps001.iq in the same directory or a suitable subdirectory) or by including a reference inside the image file to the I&Q sample file where the file format and application allow for such storage of meta-data.

Figure 5:
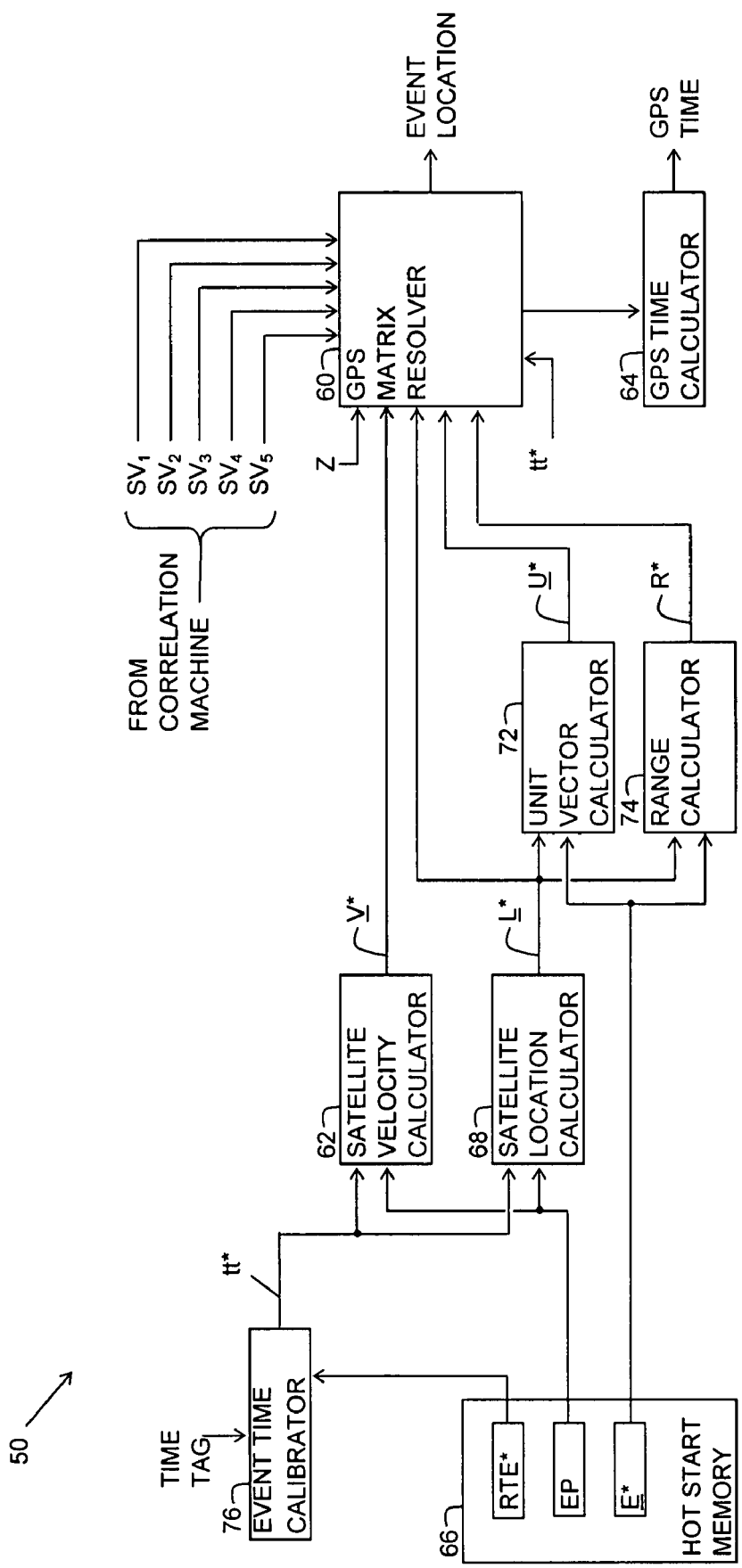
FIG. 5 is a block diagram of a GPS locator for the GPS sample processor of FIG. 3.

FIG. 5 is a block diagram of the GPS locator 50. The GPS locator 50 includes the GPS matrix resolver 60, the satellite velocity calculator 62 and the GPS time calculator 64; and also includes a hot start memory 66, a satellite location calculator 68, a unit vector calculator 72, a range calculator 74, and an event time calibrator 76. The hot start memory 66 retains ephemeris parameters EP for the GPS satellites, an assumed location vector E* for an estimate of the position of the device 12,12A when the GPS signals 19 were received, and an estimate of the receiver time error (RTE*). The asterisk mark "*" is used to represent an estimate that is later refined and improved by arithmetic processing in the GPS locator 50.

The assumed location E* and the RTE* may be based on the resolution of location and RTE of a previous event or picture. When there is a sequence of events or pictures in the file 14,14A the assumed location E* and the RTE* of an event or picture may be estimated by extrapolation either forward in time or backward in time or by interpolation from the resolved locations and RTE*s of the other events or pictures.

The event time calibrator 76 receives the GNSS signal event time tags from the data file medium 14,14A for providing time tags tt*. As an option, the calibrator 76 uses the receiver time error resolved by the GPS matrix resolver 60 for a previous (or a later) event or picture stored in the memory 66 for calibrating a new GNSS signal event time tag for offsetting the time tag tt*. The time error calibrator 76 calibration by the last receiver time error may be used to speed the resolution convergence for the GPS matrix resolver 60 and/or to offset the time uncertainty window of the receiver time error. The GPS matrix resolver 60 expects the time tag tt* to be within ±6 hours of GPS clock time when the event occurred when no estimate of position is available and ±12 hours when position is estimated with ±90° of longitude. Even greater receiver time errors are allowable when better estimates of position are available.

The satellite location calculator 68 uses the time tag tt* with the ephemeris parameters EP for providing estimated location-in-space vectors L* for several GPS satellites. The satellite velocity calculator 62 uses the time tag tt* with the ephemeris parameters EP for providing estimated velocity vectors V* for the same GPS satellites. In some cases the less accurate GPS satellite almanac parameters may be used in place of the ephemeris parameters for calculating location-in-space vectors L* and/or satellite velocity vectors V*.

The unit vector calculator 72 uses the estimated location-in-space vectors L* and the assumed event location vector E* for providing estimated unit vectors U* (also called directional cosines) for the directions between the device 12,12A and the same GPS satellites. The range calculator 74 uses the estimated location-in-space vectors L* and the assumed event location vector E* for providing estimated ranges R* between the device 12,12A and same GPS satellites. It should be noted that several of the elements of the GPS locator 50 may be implemented in software stored on a medium that is read by the microprocessor in the computer 16.

The GPS matrix resolver 60 uses the code phase offsets and DBE integers for five GPS satellites, denoted $SV_1$ through $SV_5$, the estimated ranges R*, and the speed of light C for providing linearized pseudoranges between the device 12,12A and the GPS satellites about the assumed event location vector E*. The linearized pseudoranges are used with the estimated unit vectors U* and the estimated velocity vectors V* for computing a position offset vector ΔE, the time receiver time error, and the replica clocking offset. The position offset vector ΔE is the difference between the position computed from the linearized pseudoranges and the estimated location vector E*.

This resolution process may need to be iterated several times by substituting improved assumptions and estimates. The GPS time calculator 64 calculates the GNSS-based clock time of the event from the resolution of time-of-transmission of the GPS signal received at the device 12,12A that is resolved by the GPS matrix resolver 60. The receiver time error is resolved through the process described herein but is not necessarily issued as an explicit result.

The GPS matrix resolver 60 may use an altitude Z from a positioning source other than a GNSS positioning satellite in order to reduce the required number of positioning satellites from five to four for resolving the location of the event or with five GNSS positioning satellites for overdetermining the location. The altitude Z may be carried in the date file 14,14A or entered at the computer 16. In some circumstances the altitude Z may be assumed to be sealevel.

Figure 6:
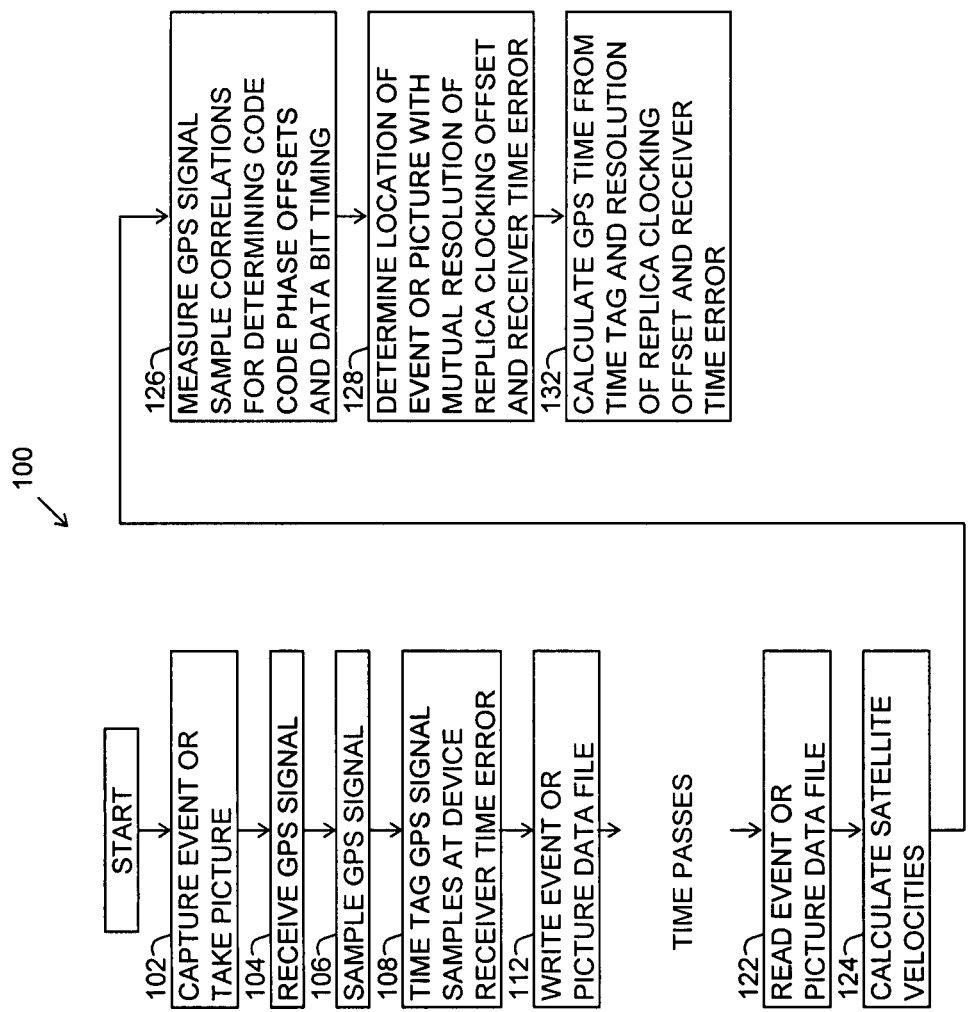
FIG. 6 is a flow chart of a GPS positioning method.

FIG. 6 is a flow chart of a method for using an event data file medium at an arbitrarily later time or date in an arbitrarily different geographical location for determining the location and time for an event (or picture) from GPS signal samples taken at the location and time of the event. The steps of the method may be embedded and stored as instructions on a computer-readable medium 100 that may be read by a computer for carrying out the steps.

A digital camera device or other event capture device takes a picture or otherwise captures an event in a step 102. In a step 104 the device receives GPS signals at the time and place of the event or picture. In a step 106 the device samples the GPS signals. In a step 108 the GPS signal samples are time tagged for the time of reception of the GPS signals. In a step 112, the device writes the event or picture with the GPS signal samples and time tags into an event data file medium. The time tags may have errors up to at least ±6 hours for GPS C/A code. Altitude may also be written into the medium. Then, time passes of seconds, minutes, hours, days, weeks, months, or even years.

An arbitrary time later the event or picture data file medium is read in a step 122 by a computer apparatus. In a step 124 the computer estimates velocities of the GPS satellites having GPS signals represented in the GPS signal samples. In a step 126 the GPS signal samples are measured by correlating and timing the samples against GPS replicas for providing correlation levels and time or phase offsets. The correlation levels are used to determine code phase offsets for the GPS replicas for signal power for the GPS signals and to determine data bit timing. The code phase offsets are determined relative to a replica clocking offset. In a step 128 the code phase offsets, data bit timing and satellite velocity estimates for typically five GPS satellites are used with matrix arithmetic for a mutual resolution of the location of the event or picture, the replica clocking offset and the receiver time error. The use of the estimated satellite velocities and the signal samples 18 for the extra GPS satellite effectively compensates for large receiver time errors. The GPS-based clock time may be computed in a step 132 from the time tag, the replica clocking error and the receiver time error.

Figure 7:
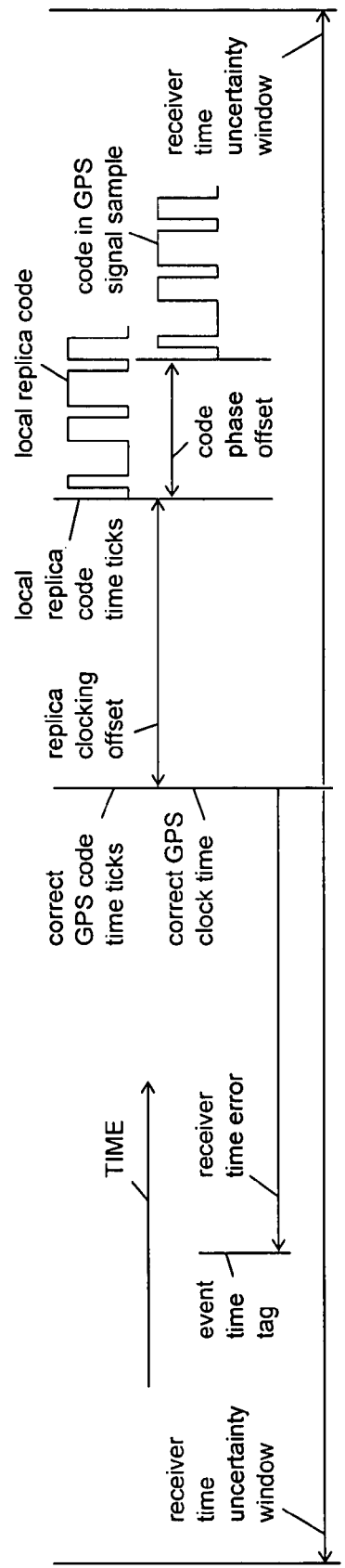
FIG. 7 is a timing chart showing a replica clocking offset and a receiver time error for the system of FIGS. 1A-B, 6 and 8.

FIG. 7 is a timing chart, not drawn to scale, showing an exemplary receiver time error that is local to the device 12,12A and an exemplary replica clocking offset that is local to the GPS sample processor 40. The receiver time error is the time difference between the event time tag and the correct GPS clock time (unknown in the system 10 until the unknowns are resolved). The acceptable range of uncertainty of the event time tag with respect to the GPS clock time is the receiver time uncertainty window. The replica clocking offset is the time difference between local replica code time ticks in the GPS signal processor 40 and the correct GPS code time ticks (unknown in the system 10 until the unknowns are resolved). The code phase offset, measured in time, is the difference between the time of the GPS code carried in the GPS signal samples 18 and the time of the local replica code generated by the GPS sample processor 40 where signal power of the GPS signals 19 is acquired and tracked. The DBE integer times are added to the time of the code phase offset for providing pseudoranges. For the GPS C/A code, the replica clocking offset and the code phase offset including the DBE integer time are typically less than twenty milliseconds. The receiver time uncertainty window may be up to at least several hours.

Acceptable Range of Receiver Time Error

The acceptable range the receiver time error (window of uncertainty of the event time tags with respect to GPS clock time) results from the orbital repetitions of the satellites, and the accuracy of an estimate of the position of the device 12,12A at the start of the resolution process. In a GPS C/A code positioning system, with no estimated position, the system 10 can resolve a correct position with a receiver time error from zero up to about six hours (plus or minus). This twelve hour window results from the approximately twelve hour orbits of the GPS satellites causing the locations-in-space of a constellation to repeat at about twelve hour intervals. At about twelve hour intervals a different position solution having a high integrity will be resolved from this constellation. Therefore, an accuracy of the receiver time error that places time within a single twelve hour window will limit the resolution process to the correct position. When an estimated position is accurate to about 90° (plus or minus) longitude, the GPS orbital characteristics allow a receiver time error of about twelve hours (plus or minus), or a window of about one day, for resolution of the correct position.

In a Galileo positioning system, with no starting estimated position, the orbital characteristics of the satellites enable the system 10 to resolve the correct position with a receiver time error from zero up to about seven hours (plus or minus), or within a fourteen hour window. When an estimated position is accurate to about 74.1° (plus or minus) longitude, the Galileo orbital characteristics allow a receiver time error from zero up to about fourteen hours (plus or minus). An estimated position accuracy of about 31.7° (plus or minus) longitude allows a receiver time error from zero up to about 35 hours (plus or minus). An estimated position accuracy of about 10.5° (plus or minus) allows a receiver time error from zero up to about five days (plus or minus).

Normally, the uncertainty range or window of the receiver time error is centered so that the receiver time error can be only as great as one-half the total window. However, computer 16 can provide a time to offset the center of the range. For example, a time offset of six hours would provide for a receiver time error of zero to twelve hours. This offset can be calculated in the computer 16 by extrapolating from receiver time errors for other events or pictures in the medium 14,14A.

Many data bits, such as almanac orbital parameters, ephemeris orbital parameters, satellite health and framing bits, repeat in successive frames of a GPS signal. The system 10 can resolve the position of the device 12,12A for an event time tag having a window of time uncertainty that is greater than the time span of the frame. A frame for GPS or Galileo has a sequence of repeating bits. Because of the repeating bits, it would be difficult for a GNSS receiver to determine time by comparing and aligning the incoming bits and the stored expected bits unless the time uncertainty window is less than a frame. The system 10 uses a different technique involving satellite velocities and signal measurements for an extra satellite for resolving time without the need for comparing the incoming and stored data bit sequences. For the GPS C/A code, the window of uncertainty of the event time tag for the system 10 is allowed to be greater than the thirty second frame of the GPS signal for resolution of the position of the event.

In GPS and Galileo, time stamps are encode in the data bits and inserted in the navigation message at regular intervals by the broadcasting satellite. In Galileo the time stamps identify GST in multiples of the shortest page period of one second. The exact timing of the message frame boundaries will be used to identify fractional GST timing (less than one frame period). This will be measured relative to the leading edge of the first chip of the first code sequence of the first frame symbol. The system 10 does not require decoding of this GST time stamp.

Matrix Arithmetic for Mutual Resolution of Unknowns for Position, Replica Clocking Offset and Receiver Time Error The discussion below describes the mutual resolution of the receiver time error RTE local to the device 12,12A, the replica clocking offset, denoted as B, local to the computer apparatus 16, and the location of the event captured by the device 12,12A. Equation 1 shows that a measured pseudorange $PR_m$ corresponding to a GPS satellite equals the true range R between the event and the satellite plus an unknown variable B for the replica clocking offset that is local to the correlation machine 48.

$$PR_m = R + B \tag{1}$$

The measured pseudorange $PR_m$ is the measured code phase offset in time plus the time for the data bit edge (DBE) integer multiplied by the speed of light. The replica clocking offset B is expressed as a distance by multiplying the time offset of the replica clocking offset by the speed of light.

Equations 2 and 2A show the location-in-space L of the satellite as a three dimensional function x(T),y(T),z(T) using the satellite orbital ephemeris parameters for computing the location-in-space L from a GNSS-based clock time-of-transmission T of the GPS signal.

$$L = x(T), y(T), z(T) \tag{2}$$

$$T = t - R/C \tag{2A}$$

The time-of-transmission T is equal to a time-of-arrival t of the GPS signal minus a transit time R/C where C is the speed of light. The above-described receiver time error RTE is the error the time-of-arrival (signal reception time) t. The location-in-space coordinates computed by x(T),y(T),z(T) are the ECEF coordinates of the GPS satellite.

Because the transit time R/C is known to be 75±10 milliseconds (mean of 75 ms plus and minus the variation of 10 ms of the transit time from the satellite to Earth for the satellite between the horizon and overhead), the transit time R/C can be replaced with a nominal value of 75 milliseconds for GPS estimation purposes. This estimation results in a few meters error in the resolution of the variables. If desired, after a solution is found using T and the range R is known to a few thousand meters, the solution can be iterated one more time using time-of-arrival t in place of time-of-transmission T for a more accurate answer. The use of arrival time t place of transmission time T and the additional iteration is unnecessary until the last iteration and is unnecessary if ten meters accuracy is sufficient.

Equation 3 shows the relationship of the range R as a function of the time-of-transmission T to the location-in-space x(T),y(T),z(T) of the satellite and an estimate of the coordinates X,Y,Z for the geographical location of the device 12,12A at the event with the approximation that time T equals the reception time t minus 75 milliseconds. The device coordinates X,Y,Z may in some cases be derived from the resolution of the X,Y,Z of a previous event.

$$R(T)^2 = (X - x(T))^2 + (Y - y(T))^2 + (Z - z(T))^2 \tag{3}$$

Equation 4 combines equations 1 and 3.

$$PR_m = [(X - x(T))^2 + (Y - y(T))^2 + (Z - z(T))^2]^{1/2} + B \tag{4}$$

It might be noted that the discussions above listed the five unknowns that required resolution as the three dimensions of location of the device 12,12A, the replica clocking error, and the receiver time error. However, the current discussion lists the five unknown variables that must be resolved as the device event location coordinates (X,Y,Z), the replica clocking offset B (expressed in units of length) and the GPS signal transmission time T. This can be understood by observing that the receiver time error RTE is resolved when the time-of-transmission T is resolved according to the relationship that the RTE is the difference between the time tag of the device 12,12A and the time T (allowing for the transit time R/C). Therefore, the RTE is resolved when the time T is resolved. The elements X,Y,Z,B,T are unknowns that are mutually resolved as described below. The unknowns are said to be mutually resolved because no one unknown is resolved before all the unknowns are resolved. The resolution of a GPS time T provides the resolution of the receiver time error RTE as the difference between a GPS time T and the time tag of the GPS signal samples.

Equation 5 shows the satellite velocity vector V as a three dimensional function x'(T),y'(T),z'(T) using the satellite orbital ephemeris parameters for computing the velocity of the GPS satellite from the time-of-transmission T of the GPS signal. The functions x'(T),y'(T),z'(T) are the scalar speeds of the satellite in the three dimensions x, y and z.

$$V = (x'(T), y'(T), z'(T)) \tag{5}$$

When the device 12,12A is expected to have a high velocity, for example when the device 12,12A is being used in an automobile or an airplane, the three dimensional satellite velocity function x'(T),y'(T),z'(T) should be the difference between the satellite velocity function based on the satellite ephemeris parameters and an expected or estimated velocity of the device 12,12A in the same three dimensions. The 3D device velocity may in some cases be derived from the resolution of the X,Y,Z of previous events.

Equation 6 shows the satellite unit vector U as a function of the time-of-transmission T for the direction from the event to the satellite in three dimensions x, y and z as functions of the time T. The unit vector U is computed from the assumed or estimated coordinates X,Y,Z of the event and the location-in-space L of the satellite.

$$U(T)=(u_x(T),u_y(T),u_z(T))=(X-x(T))/R(T),(Y-y(T))/R(T),(Z-z(T))/R(T)) \quad (6)$$

Equation 7 shows a satellite range rate rr as a function of the time-of-transmission T in terms of the unit vector U and the satellite velocity vector V for the time T.

$$rr(T)=(u_x(T)u_y(T),u_z(T))\cdot(x'(T),y'(T),z'(T))=U(T)\cdot V(T) \quad (7)$$

Equation 8 shows a calculated pseudorange $PR_c$ as a function of the time-of-transmission T in terms of a calculated range $R_c$ as a function of time T as shown in the equation 4 between an assumed or estimated location X,Y,Z of the event and the satellite location-in-space L.

$$PR_c(T)=R_c(T)+B \quad (8)$$

Equations 9 and 9A show a satellite row vector RV derived from the partial derivative of the calculated pseudorange $PR_c$ as a function of (X,Y,Z,B,T) with respect to the time T. The satellite row vector RV has five components: the unit vector U having three components $u_x,u_y,u_z$, one component for a constant G, and one component for the range rate rr. The constant G is the sensitivity of the pseudorange to the replica clocking offset B. It is preferred that both the pseudorange and the offset B are expressed in meters. When meters are used the constant G is one.

$$\partial PR_c/\partial(X,Y,Z,B,T)=RV=(u_x,u_y,u_z,G,-rr) \quad (9)$$

$$RV=(u_x,u_y,u_z,G,-((u_x,u_y,u_z)\cdot(x',y',z')) \quad (9A)$$

Equation 10 is a satellite velocity positioning matrix [H]. The satellite velocity positioning matrix [H] has K row vectors RV for K satellites, respectively denoted as SV1, SV2, SV3, SV4, SV5 and five columns for the five components of the row vectors RV.

$$H = \begin{matrix} u_x^{SV1}, u_y^{SV1}, u_z^{SV1}, G, -(u_x^{SV1}, u_y^{SV1}, u_z^{SV1})\cdot(x^{SV1}, y^{SV1}, z^{SV1}) \\ u_x^{SV2}, u_y^{SV2}, u_z^{SV2}, G, -(u_x^{SV2}, u_y^{SV2}, u_z^{SV2})\cdot(x^{SV2}, y^{SV2}, z^{SV2}) \\ u_x^{SV3}, u_y^{SV3}, u_z^{SV3}, G, -(u_x^{SV3}, u_y^{SV3}, u_z^{SV3})\cdot(x^{SV3}, y^{SV3}, z^{SV3}) \\ u_x^{SV4}, u_y^{SV4}, u_z^{SV4}, G, -(u_x^{SV4}, u_y^{SV4}, u_z^{SV4})\cdot(x^{SV4}, y^{SV4}, z^{SV4}) \\ u_x^{SV5}, u_y^{SV5}, u_z^{SV5}, G, -(u_x^{SV5}, u_y^{SV5}, u_z^{SV5})\cdot(x^{SV5}, y^{SV5}, z^{SV5}) \end{matrix} \quad (10)$$

Finally, equation 10A shows that the difference between the measured pseudorange $PR_m$ and the calculated pseudorange $PR_c$ is a pseudorange residual $\Delta PR$.

$$\Delta PR=PR_m-PR_c \quad (10A)$$

Figure 8:
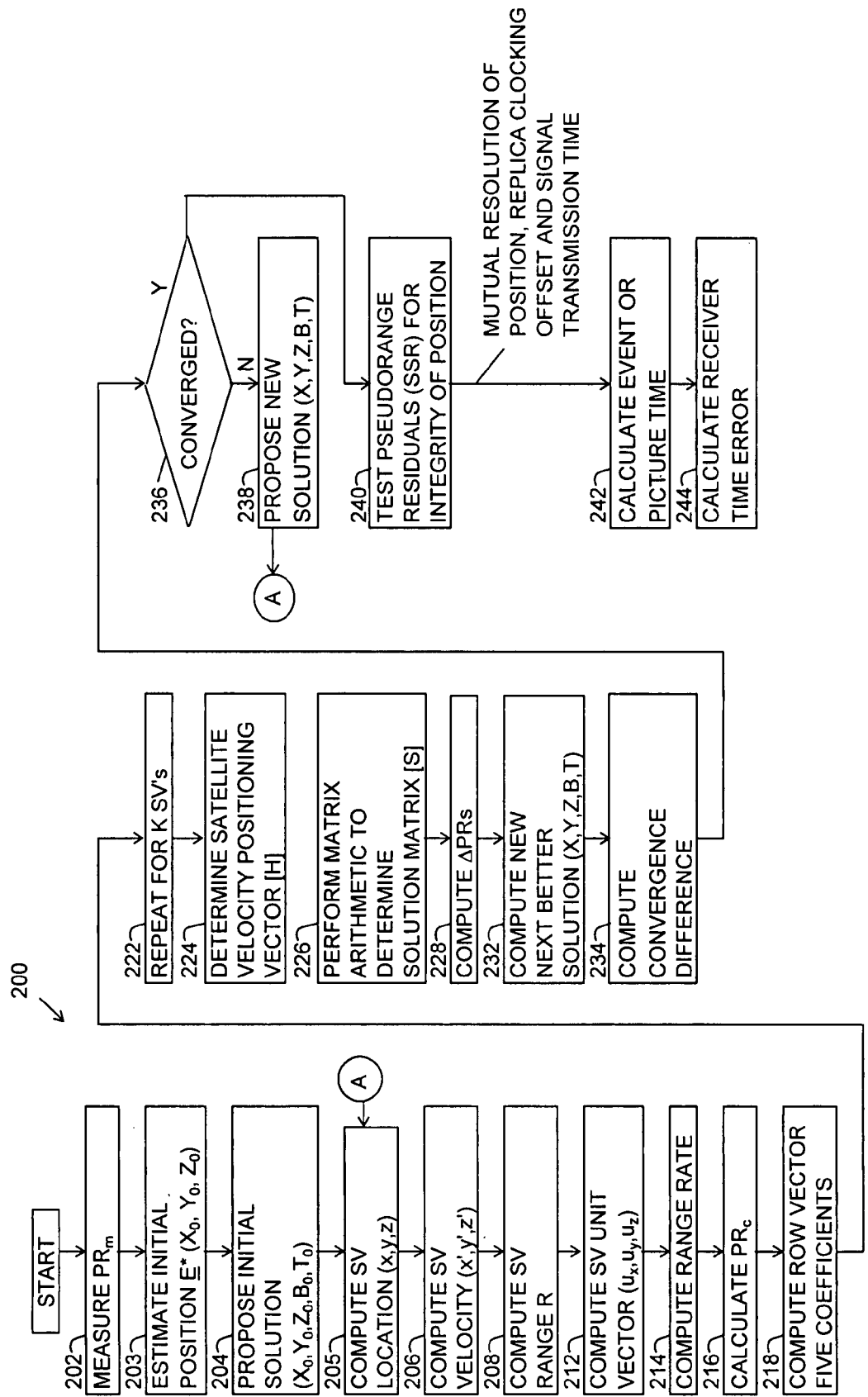
FIG. 8 is a flow chart of a method for using an extra GPS satellite and velocity estimates of GPS satellites for resolving the location and time of an event when the GPS signals were received with a large receiver time error.

FIG. 8 is a flow chart of the steps for a mutual resolution of the five unknown variables X,Y,Z,B,T by the GPS matrix resolver 60. The variables X,Y,Z are the GPS-based position of the event, the variable B is the replica clocking offset and the variable T is the time-of-transmission of the GPS signal. The receiver time error RTE is resolved by resolving the time T. The steps of the method may be provided in a tangible medium 200 having a code in a computer-readable form that may be read by a computer for carrying out the steps.

Step 202, measure the pseudorange $PR_m$ for a satellite by measuring the code phase offset and DBE integer.

Step 203, estimate an initial position ($X_0$, $Y_0$, $Z_0$). The initial position ($X_0$, $Y_0$, $Z_0$) may be estimated from the positions that have been resolved for previous events or pictures, or based on extrapolation or interpolation from the positions resolved for other events or pictures, or entered by a user of the device 12,12A, or entered by a user of the computer 16.

Step 204, propose an initial (0th) mutual resolution ($X_0$, $Y_0$, $Z_0$, $B_0$, $T_0$). Conventional methods for anywhere fix can be used when no estimated position E* is known for initial position ($X_0$, $Y_0$, $Z_0$). The time $T_0$ must be known to within an acceptable range of the estimated time tt* based on the time tag for the GPS signal samples 18 and the unknown receiver time error.

Step 205, compute a satellite (SV) location-in-space vector L ($x_0,y_0,z_0$) from the satellite orbital ephemeris parameters at the time $T_0$.

Step 206, compute a satellite velocity vector V ($x'_0,y'_0,z'_0$) from the satellite orbital ephemeris parameters at the time $T_0$.

Step 208, compute the range R at the time $T_0$ for the device position ($X_0,Y_0,Z_0$) and the satellite location ($x_0,y_0,z_0$) as shown in an equation 11.

$$R_0=[(X_0-x_0)^2+(Y_0-y_0)^2+(Z_0-z_0)^2]^{1/2} \quad (11)$$

Step 212, compute a unit vector U ($u_{x0},u_{y0},u_{z0}$) at the time $T_0$, for the direction between the event and the satellite as shown in an equation 12.

$$(u_{x0},u_{y0},u_{z0})=((X_0-x_0)/R_0,(Y_0-y_0)/R_0,(Z_0-z_0)/R_0) \quad (12)$$

Step 214, compute a rate of change of the range (range rate) rr at the time $T_0$ between the event and the satellite as the dot product of the satellite velocity vector ($x'_0,y'_0,z'_0$) at $T_0$ and the unit direction vector ($u_{x0},u_{y0},u_{z0}$) at $T_0$ as shown in an equation 13.

$$rr_0=(u_{x0},u_{y0},u_{z0})\cdot(x'_0,y'_0,z'_0) \quad (13)$$

Step 216, calculate a pseudorange $PR_c$ at the time $T_0$ for the range $R_0$ and the replica clocking offset $B_0$ according to an equation 14.

$$PR_{c0}=R_0+B_0 \quad (14)$$

Step 218, calculate a satellite row vector RV at the time $T_0$ according to an equation 15. The satellite row vector RV has five components including the three components $u_{x0}, u_{y0}, u_{z0}$ for the unit vector $U_0$, one component for the constant G, and one component for the range rate $rr_0$.

$$RV_0=(u_{x0},u_{y0},u_{z0},G,-rr_0) \quad (15)$$

An equation 16 shows the row vector $RV_0$ for a kth satellite where the term for the range rate $rr_0$ is expanded to show that it is a dot product of the unit vector $U_0$ and the velocity $V_O$.

$$RV_0=u_{x0}^{SVk},u_{y0}^{SVk},u_{z0}^{SVk},G,-(u_{x0}^{SVk},u_{y0}^{SVk},u_{z0}^{SVk})\cdot(x'_0{}^{SVk},y'_0{}^{SVk},z'_0{}^{SVk}) \quad (16)$$

Step 222, repeat the above steps 202 to 218 for K−1 additional satellites (for a total of K satellites) where K is five or more so that K satellite row vectors $RV_0$ of the equation 16 may be arranged as a satellite velocity positioning matrix [H]. The satellite velocity positioning matrix [H] is arranged as K row vectors corresponding to the K satellites by five column vectors corresponding to the five coefficients of the row vectors RV for the satellites.

$$H = \begin{matrix} u_x^{SV1}, u_y^{SV1}, u_z^{SV1}, G, -(u_x^{SV1}, u_y^{SV1}, u_z^{SV1}) \cdot (x^{SV1}, y^{SV1}, z^{SV1}) \\ u_x^{SV2}, u_y^{SV2}, u_z^{SV2}, G, -(u_x^{SV2}, u_y^{SV2}, u_z^{SV2}) \cdot (x^{SV2}, y^{SV2}, z^{SV2}) \\ u_x^{SV3}, u_y^{SV3}, u_z^{SV3}, G, -(u_x^{SV3}, u_y^{SV3}, u_z^{SV3}) \cdot (x^{SV3}, y^{SV3}, z^{SV3}) \\ u_x^{SV4}, u_y^{SV4}, u_z^{SV4}, G, -(u_x^{SV4}, u_y^{SV4}, u_z^{SV4}) \cdot (x^{SV4}, y^{SV4}, z^{SV4}) \\ u_x^{SV5}, u_y^{SV5}, u_z^{SV5}, G, -(u_x^{SV5}, u_y^{SV5}, u_z^{SV5}) \cdot (x^{SV5}, y^{SV5}, z^{SV5}) \end{matrix}$$

Step 224, determine the satellite velocity positioning matrix [H] at time $T_0$. The satellite velocity positioning matrix [H] at time $T_0$ is denoted as $[H_0]$.

Step 226 perform matrix arithmetic on the matrix $[H_0]$ to determine a solution matrix $[S_0]$ according to an equation 17.

$$[S_0] = [[[H_0]^t \times [H_0]]^{-1} \times [H_0]^t] \tag{17}$$

In the equation 17, the matrix $[H_0]^t$ is the transpose of $[H_0]$ the matrix $[[H_0]^t \times [H_0]]^{-1}$ is the matrix inversion of the product of the satellite velocity positioning matrix $[H_0]$ and its transpose matrix $[H_0]^t$. The solution matrix $[[[H_0]^t \times [H_0]]^{-1} \times [H_0]^t]$ has dimensions of five rows by K columns.

The product matrix $[[H]^t \times [H]]^{-1}$ contains the Dilution of Precision (DOP) values. This matrix can be used to assess the accuracy and stability of the process. If the scaled trace of the matrix $[[H]^t \times [H]]^{-1}$ exceeds a certain value, the iterative estimation process can become unstable. The procedure in such a case is to choose a different constellation of satellites for consideration or use more satellites (increase K). Another method is to just examine the square root of the sum of the first four elements of the diagonal of $[[H]^t \times [H]]^{-1}$. This corresponds to the classical GDOP of GPS; if it is less than a preselected number such as ten, the satellite geometry is such that a least squares solution is reasonably precise.

Step 228, take K pseudorange residuals between the measured pseudoranges $PR_m$ and the calculated pseudoranges $PR_{c0}$ at the time $T_0$ on a satellite-by-satellite basis as shown in an equation 18.

$$\Delta PR_0 = PR_m - PR_{c0} \tag{18}$$

The K pseudorange residuals $(PR_m - PR_{c0})$ form a column vector $\Delta PR_0$ of length K.

Step 232, perform matrix arithmetic on the column vector for the initial solution $(X_0, Y_0, Z_0, B_0, T_0)$, the solution matrix $[S_0]$ and the pseudorange residual column vector $\Delta PR_0$ for the K $(K \geq 5)$ satellites for generating a new, next better, solution $(X_1, Y_1, Z_1, B_1, T_1)$ according to an equation 19.

$$[X_1, Y_1, Z_1, B_1, T_1] = [X_0, Y_0, Z_0, B_0, T_0] + [S_0] \times [\Delta PR_0] \tag{19}$$

In the equation 19, a column vector $(X_1, Y_1, Z_1, B_1, T_1)$ for the new solution is the sum of the column vector $(X_0, Y_0, Z_0, B_0, T_0)$ for the old solution and the column vector for the matrix product of the solution matrix $[S_0]$ times the pseudorange residual column vector $\Delta PR_0$.

Step 234, compute a convergence distance $\Delta CD_1$ according to an equation 20 for the difference between the new position $(X_1, Y_1, Z_1)$ and the old position $(X_0, Y_0, Z_0)$ $$\Delta CD_1 = ((X_1-X_0)^2 + (Y_1-Y_0)^2 + (Z_1-Z_0)^2)^{1/2} \tag{20}$$

Step 236, compare the convergence difference $\Delta CD_1$ to a selected convergence difference threshold. A reasonable threshold is in the range of a one to one-hundred meters. The convergence threshold comparison may be performed for a square of the convergence difference $\Delta CD_1^2$ against a square of the threshold, thereby avoiding the arithmetic operation of taking a square root of the sum of the squares for $(X_1-X_0)^2 + (Y_1-Y_0)^2 + (Z_1-Z_0)^2$.

When the convergence distance $\Delta CD_1$ is less than the selected threshold for convergence, the solution $(X_1, Y_1, Z_1, B_1, T_1)$ is the successful mutual resolution of the event location (X,Y,Z), the replica clocking offset B, and the receiver time error RTE (included within the resolution of the time-of-transmission T). The receiver time error RTE is the difference between the time tag of the event from the device 12,12A and the actual time-of arrival t (equation 2A) in GPS clock time of the GPS signal for the event. It should be noted that the solution for (X,Y,Z,B,T) resolves the receiver time error RTE without a requirement for issuing an explicit number for receiver time error RTE. However, the resolution of the receiver time error RTE may be used for reducing the error in the time tt* in order to reduce the time or number of iterations for resolution convergence.

Step 238, when the convergence distance $\Delta CD_1$ is greater than the selected threshold for convergence, the old proposed solution $(X_0, Y_0, Z_0, B_0, T_0)$ is replaced with the new, next better solution $(X_1, Y_1, Z_1, B_1, T_1)$ and the above steps 204 to 236 are repeated to compute a new, next better solution $(X_2, Y_2, Z_2, B_2, T_2)$ for a new, next better position $(X_2, Y_2, Z_2,)$ and so on for n times until a convergence distance $\Delta CD_n$ is greater than the selected threshold for convergence.

The convergence process is repeated until a solution $(X_n, Y_n, Z_n, B_n, T_n)$ is obtained where the convergence distance $\Delta CD_n$ between the nth position $(X_n, Y_n, Z_n)$ and the (n-1)th position $(X_{n-1}, Y_{n-1}, Z_{n-1})$ is less than the convergence threshold, denoted by $C_{Th}$, according to equations 21 and 22.

$$[X_n, Y_n, Z_n, B_n, T_n] = [X_{n-1}, Y_{n-1}, Z_{n-1}, B_{n-1}, T_{n-1}] + [S_{n-1}] \times [\Delta PR_{n-1}] \tag{21}$$

$$\Delta CD_n = ((X_n-X_{n-1})^2 + (Y_n-Y_{n-1})^2 + (Z_n-Z_{n-1})^2)^{1/2} < C_{Th} \tag{22}$$

When the convergence is acceptable the solution $(X_n, Y_n, Z_n, B_n, T_n)$ is resolved.

In general, greater receiver time errors will require more resolution iterations and a longer time to converge on the solution of the unknown variables for the location of the event. A calculation of the square of the sum of the squares of the pseudorange residuals (SSR) may be used as an integrity acceptance rejection criteria. A high integrity is indicated by a low SSR. If time is not well known, a first pass of iterations may use a coarse mesh of time estimates, for example every half hour, then take the most nearly successful solution as judged by the lowest SSR, and then use that time as a iterating within a fine mesh of time estimates. The SSR may use weightings so that pseudoranges corresponding to GPS signals 19 having higher signal strength are weighted more heavily.

Step 240, determine a sum of the squares of the pseudorange residuals (SSR) for determining the integrity of the position according to an equation 23. The solution may have converged to a solution but that solution may not be reliable. A high SSR indicates that the solution should not be relied upon.

$$SSR = \left\{ \begin{matrix} [(PR_m - PR_c)^{SV1}]^2 + [(PR_m - PR_c)^{SV2}]^2 + \\ [(PR_m - PR_c)^{SV3}]^2 + [(PR_m - PR_c)^{SV4}]^2 + [(PR_m - PR_c)^{SV5}]^2 \end{matrix} \right\} \tag{23}$$

When the SSR is acceptable, the solution $(X_n, Y_n, Z_n, B_n, T_n)$ is considered to have integrity.

Step 242, calculate GNSS-based time for the event or picture from the GNSS-based time-of-transmission T that was resolved, the transit time that can be calculated using the position that was resolved, and replica clocking offset B.

Step 244, calculate receiver time error RTE from the time tag for the GPS signal samples, the time T and the transit time. This calculated receiver time error for the current set of GNSS signal samples may be used to offset or extend the acceptable range for the error in the time tags for other sets of GPS signal samples.

Although the present invention has been described in terms of the present embodiments, it is to be understood that such disclosure is not to be interpreted as limiting. Various supersets, subsets and equivalents will no doubt become apparent to those skilled in the art after having read the above disclosure. However, these supersets, subsets and equivalents should not be regarded as limiting the idea of the invention. Accordingly, it is intended that the claims, written below be interpreted as covering the present invention's true spirit and scope.

The invention claimed is:

1. A location system for a digital camera, comprising:
a global navigation satellite system (GNSS) signal sampler to sample a GNSS signal when a digital camera picture is taken to provide a sequence of samples of said GNSS signal and to apply a time tag to said GNSS signal samples corresponding to a time of said picture, said time tag having a receiver time error;
an event time calibrator to calibrate said time tag according to at least one prior or later said receiver time error that is resolved by processing said GNSS signal samples for at least one prior or later said picture, respectively; and
a computer apparatus to process said GNSS signal samples and said time tag to mutually resolve said receiver time error together with coordinates of a GNSS picture position.

2. The camera system of claim 1, further comprising:
a digital camera including said GNSS signal sampler; and a picture device for taking said digital camera picture; a real time clock for generating said time tag having said receiver time error local to said digital camera; and a picture file formatter to write said picture data, said GNSS signal samples and said time tag into a computer-readable picture data file medium; and wherein:
said computer apparatus is configured to read said picture file data medium to mutually resolve said GNSS picture position, said receiver time error, and a replica clocking offset local to the computer apparatus.

3. The camera system of claim 1, wherein:
said receiver time error is greater than thirty seconds.

4. The camera system of claim 1, wherein:
said receiver time error may be up to at least twelve hours.

5. The camera system of claim 1, wherein:
said GNSS signal samples represent said GNSS signals for a time period less than a time length between transmissions of encoded data bits having a GNSS system clock time.

6. The camera system of claim 5, wherein:
said GNSS signal samples represent less than six seconds of said GNSS signals.

7. The camera system of claim 1, wherein:
said computer apparatus includes:
a velocity estimator to estimate, for said time tag, five GNSS satellite velocities corresponding to five GNSS satellites, respectively;
correlators to correlate said GNSS signal samples to determine five code phase offsets corresponding to said five GNSS satellites, respectively; and
a GNSS matrix resolver to use said five GNSS satellite velocities with said five code phase offsets to mutually resolve five unknowns of a replica clocking offset local to said correlators, said receiver time error local to said GNSS signal sampler, and three dimensions of said GNSS picture position.

8. The camera system of claim 7, wherein:
said computer apparatus includes:
a velocity estimator to estimate, for said time tag, K GNSS satellite velocities corresponding to K GNSS satellites, respectively, for said K at least four;
correlators to determine K code phase offsets, for said GNSS signal samples, corresponding to said K GNSS satellites, respectively; and
a GNSS matrix resolver to use said K GNSS satellite velocities with said K code phase offsets to mutually resolve unknowns of a replica clocking offset local to said correlators, said receiver time error local to said GNSS signal sampler, and said GNSS picture position.

9. The camera system of claim 8, wherein:
said GNSS matrix resolver is constructed to use said K GNSS satellite velocities in a satellite velocity positioning matrix having K row vectors corresponding to said K GNSS satellites, respectively, and five columns, said five columns including three said columns for estimated unit vectors between an estimated said GNSS picture position and estimated locations-in-space of said K GNSS satellites, one said column for a constant, and one said column for estimated range rates between said estimated GNSS picture position and said estimated locations-in-space of said K GNSS satellites; and then using said satellite velocity positioning matrix and said code phase offsets for said mutual resolution of said unknowns.

10. The camera system of claim 2, wherein:
said digital camera includes an altimeter for providing data representative of an altitude; and
said computer apparatus is constructed for using said altitude with said GNSS signal samples for determining said GNSS picture position.

11. A method for providing a global navigation satellite system (GNSS)-based position for a picture, comprising:
converting a scene into digital picture data;
sampling a GNSS signal for providing a sequence of samples of said GNSS signal corresponding to said picture data;
generating a time tag for said GNSS signal samples corresponding to a time of said picture data, said time tag having a receiver time error;
calibrating said time tag according to at least one prior or later said receiver time error that is resolved by processing said GNSS signal samples for at least one prior or later said picture, respectively; and
processing said GNSS signal samples and said time tag for mutually resolving said receiver time error together with coordinates of a GNSS picture position.

12. The method of claim 11, further comprising:
writing said picture data with said GNSS signal samples and said time tag from a digital camera into a picture data file medium;
reading said picture file data medium in a computer apparatus; and mutually resolving said GNSS picture position, said receiver time error that is local to said scene, and a replica clocking offset that is local to said computer apparatus.

13. The method of claim 11, wherein:
said receiver time error is greater than thirty seconds.

14. The method of claim 11, wherein:
said receiver time error may be up to at least twelve hours.

15. The method of claim 11, wherein:
said GNSS signal samples represent said GNSS signals for a time period less than a time period between transmissions of encoded data bits having a GNSS system clock time.

16. The method of claim 15, wherein:
said GNSS signal samples represent less than six seconds of said GNSS signals.

17. The method of claim 11, wherein:
the step of processing includes:
estimating, for said time tag, five GNSS satellite velocities corresponding to five GNSS satellites, respectively;
correlating said GNSS signal samples for determining five code phase offsets corresponding to said five GNSS satellites, respectively; and
using said five GNSS satellite velocities with said five code phase offsets for mutually resolving five unknowns of a replica clocking offset local to said correlators, said receiver time error local to said GNSS signal sampler, and three dimensions of said GNSS picture position.

18. The method of claim 17, wherein:
the step of processing includes:
estimating, for said time tag, K GNSS satellite velocities corresponding to K GNSS satellites, respectively, for said K at least four;
correlating said GNSS signal samples for determining K code phase offsets corresponding to said K GNSS satellites, respectively; and
using said K GNSS satellite velocities with said K code phase offsets for mutually resolving unknowns of a replica clocking offset local to said correlators, said receiver time error local to said GNSS signal sampler, and said GNSS picture position.

19. The method of claim 18, wherein:
the step of processing includes using orbital satellite parameters for determining a satellite velocity positioning matrix having K row vectors corresponding to said K satellites, respectively, and five columns, said five columns including three said columns for estimated unit vectors between an estimated said GNSS picture position and estimated locations-in-space of said K GNSS satellites, one said column for a constant, and one said column for estimated range rates between said estimated GNSS picture position and said estimated locations-in-space of said K GNSS satellites, said estimated range rates computed from said estimated unit vectors and said estimated satellite velocities; and then using said satellite velocity positioning matrix and said code phase offsets for said mutual resolution of said unknowns.

20. The method of claim 11, further comprising:
reading an altimeter for determining an altitude; and
using said altitude with said GNSS signal samples for determining said GNSS picture position.

21. A tangible medium having computer-readable instructions for reading by a computer for carrying out the following steps:
converting a scene into digital picture data;
sampling a GNSS signal for providing a sequence of samples of said GNSS signal corresponding to said picture data;
generating a time tag for said GNSS signal samples corresponding to a time of said picture data, said time tag having a receiver time error;
calibrating said time tag according to at least one prior or later said receiver time error that is resolved by processing said GNSS signal samples for at least one prior or later said picture, respectively; and
processing said GNSS signal samples for mutually resolving said receiver time error with coordinates of a GNSS picture position.

* * * * *